United States Patent [19]
Puckett

[11] 3,782,020
[45] Jan. 1, 1974

[54] FISHING APPARATUS
[76] Inventor: Delbert Vernon Puckett, 447 Demontluzin St., Bay St. Louis, Miss. 39520
[22] Filed: Mar. 3, 1972
[21] Appl. No.: 240,555

[52] U.S. Cl. ..................................................... 43/8
[51] Int. Cl. ............................................ A01k 73/02
[58] Field of Search ...................... 43/4.5, 8, 9, 6.5

[56] References Cited
UNITED STATES PATENTS
| | | | |
|---|---|---|---|
| 1,490,428 | 4/1924 | Paris | 43/8 |
| 3,608,217 | 9/1971 | Voisin, Sr. | 43/9 X |
| 2,684,549 | 7/1954 | Olden | 43/9 |

*Primary Examiner*—Louis G. Mancene
*Assistant Examiner*—Daniel J. Leach
*Attorney*—Alvin Edward Moore

[57] ABSTRACT

Apparatus and method for net-fishing from points forward of the bow of a fishing vessel, which may be a powered boat or a barge pushed by a powered craft. The net is supported by a tubular frame having beams that are pivoted at or near the stern of the vessel. A deck winch lowers the forward end of the connected frame and net from their elevated position over the bow and to a fishing location below the bow by means of a line over a pulley on a high mast. From this location the net trails below the vessel, with its forward opening for entry of fish during forward movement of the vessel. This mouth of the net is kept open by spaced cross pieces of the net frame. When used for fishing just above the sea bottom the apparatus preferably includes a fish-moving chain or set of teeth, extending across and in front of the base of the net mouth, fastened at its ends to forwardly projecting ends of side arms of the frame. When fishingfor oysters, the set of teeth is preferably used, for breaking oyster shells loose from an oyster bed. After a desired load of fish is in the net it and the forward end of the frame are pivotally lifted by the winch and line over the bow until the axis of the net is upright. Then its lower portion is untied (or un-zippered), and the fish is thus dumped onto the deck (or into the hold or a container).

12 Claims, 7 Drawing Figures

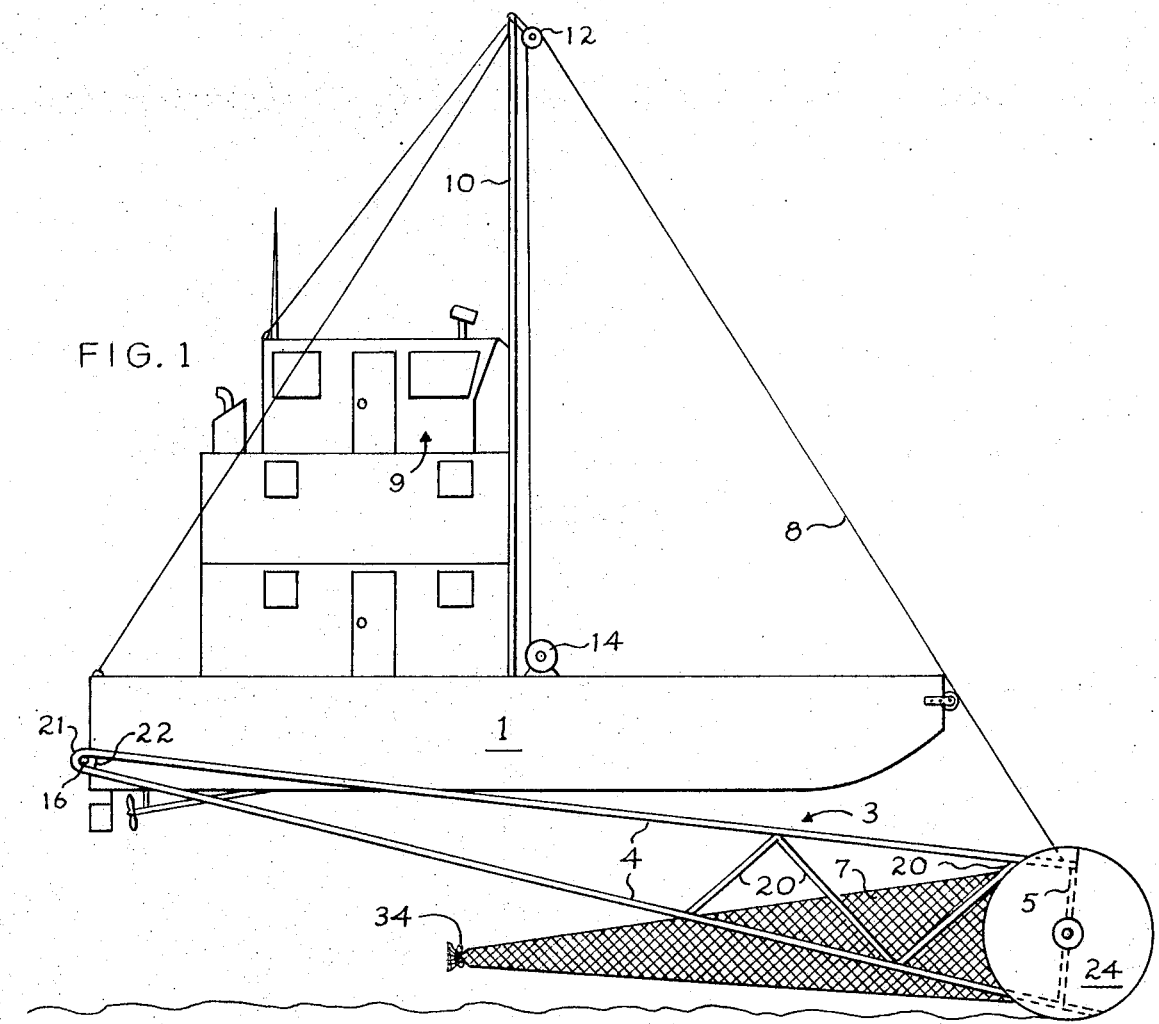

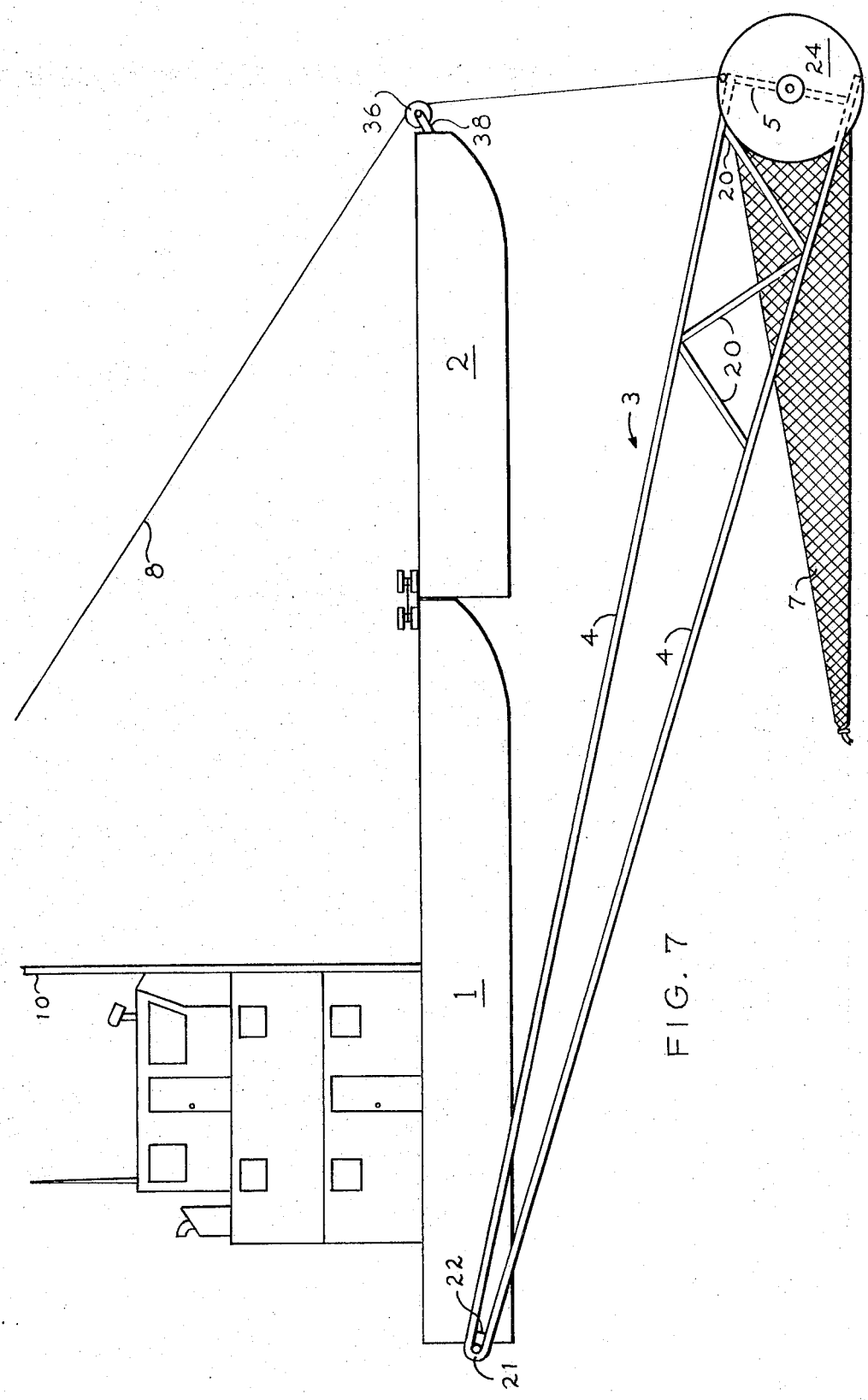

FISHING APPARATUS

The presently common, age-old method of netting fish from a boat, involving dragging a net from the boat's stern, has several disadvantages. Chief among these is the fact that the water-traversing bulk of the vessel and noise and wake from its propeller scare the fish away from in front of the opening of the net. An attempt has been made to counteract this difficulty by electrically shocking the fish into momentary inaction, but this entails heavy and expensive equipment.

In view of these facts, some objects of the present invention are to provide: (1) apparatus and method for fishing with a net whose opening is forward of or below the bow of a fishing boat or a barge in front of the boat; (2) apparatus comprising a net supported at its sides by a pair of beams which are so mounted relative to the boat that they may be curvingly moved over the bow and into position in the water with their forward ends at or below the bottom of the boat (or barge) and with the net opening located forward or below the bow; (3) apparatus of this type, in which the net-supporting beams have bearings at their forward ends, comprising wheels (or skids) capable of engaging the ground in shallow-water fishing, thus holding the net just above the ground but not in net-damaging contact with it; (4) a method of fishing comprising the step of pivotally positioning an elongated net over the bow of a vessel and allowing it to move sternward below the craft. These and other objects will be apparent in the following specification and the accompanying drawings.

In these drawings:

FIG. 1 is a side elevational view of a net in fishing position below a boat;

FIG 2 is a top plan view of the boat and apparatus of FIG. 1;

FIG. 3 is a front view, partly broken away, of the apparatus of FIGS. 1 and 2;

FIG. 7 is a side elevational view of a fishing vessel pushing a barge, with the invented apparatus shown as having net-supporting beams much longer than in FIGS. 1 and 6, adapted for net-fishing below the barge and in deeper waters.

Figure 4:
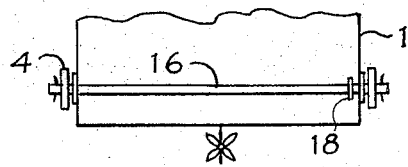
FIG. 4 is a rear elevational view of the boat and apparatus.

The apparatus of the invention basically comprises: a fishing vessel (a powered boat 1, or a barge 2 forward of a powered boat); an elongated net-supporting frame 3 having triangularly arranged side beams or arms 4, pivotally attached to the stern of the boat; a pair of upright elements 5, welded to forward ends of the arms 4; and upper and lower, vertically separated cross pieces 6, welded to arms 4; a net 7, supported on the frame with its forward end edges held in a fish-receiving opening by the upright elements 5 and cross pieces 6; and a line 8 (a rope, cable or the like), attached to the upper cross piece 6, optionally passing over a rotary element at the bow, by which the frame and net are lowered into fishing positions and later raised with a load of fish or the like. Throughout this specification and the appended claims the words "fish" and "fishing" refer to: ordinary fish; shellfish; porpoises; seals; or other aquatic mammals.

The powered boat 1 may be of any known type. For example, the boat used with the invention advantageously may have a high pilot house, 9, of aid in vision and in supporting the high mast 10, which preferably is a part of the invention, supporting the pulley 12, over which the line 8 is pulled by the net-elevating winch 14.

As illustrated in FIG. 7, the fish-holding vessel optionally may be a barge 2, pushed by the powered boat 1. In this arrangement the frame 3 is preferably hinged to the stern of the boat instead of the barge; therefore, the net may be positioned to catch fish in deep water. Another advantage of this assembly is the fact that the boat 1 may stay in fishing operation a long time, while a tugboat tows each fish-loaded vessel 2 to an unloading location, and the same or another tugboat pushes an empty, refrigerated barge out to be placed ahead of the fishing boat.

The forked, net-supporting frame 3 is shown as having its arms 4 pivoted on the fixed axle 16. This shaft is longer than the width of the stern and is shown as fixed to it by the U-bolts, clamps or the like, 18. Alternatively, the shaft may be welded to the stern or built into the boat. Optionally, the pivot bearings for the after ends of arms 4 may be strongly fixed to the sides of the boat adjacent to the stern. The frame, including the diagonal braces 20, preferably comprises welded-together lengths of pipe — for example, of steel, aluminum alloy or reinforced plastic. The adjacent after ends of the triangularly arranged pair of the tubular arms 4 are joined by a curved pipe element 21 which may be integral with or welded to the arms 4. These bowed elements are the after portions of the pivotal bearings of the frame on the axle 16. The short plates 22, welded between arms 4, complete these bearings. Alternatively, these bearing elements and the pipes 4 may be replaced by triangular plates of longitudinally ridged metal or reinforced plastic.

When fishing on or near the bottom the wheels 24, capable of rolling on the ground, having their bottoms at an elevation below the bottom of the net, protecting the net from excessive wear against the ground, are preferably part of the assembly. Each of these wheels is journaled on a short axle 26, welded or otherwise fixed to an upright frame element 5. Instead of the wheels, skids with curved forward ends may be mounted or formed on the forward ends of the lower arms 4. For example, the forward end 28 of each of the lower pipes 4 may be integrally curved, in a rounded skid that in fishing position juts forward and below the elevation of the upper cross piece 6, thus curving upward above the elevation of the lower end of upright 5.

Figure 5:
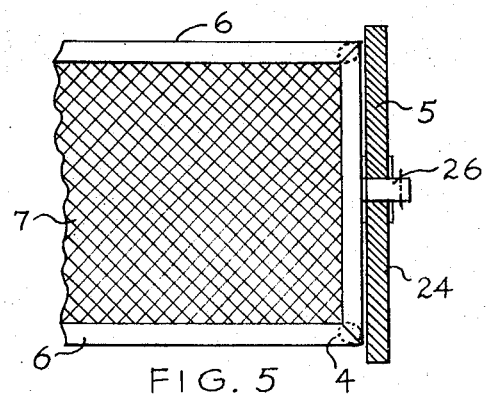
FIG. 5 is a sectional, front-elevational, detail view, on a scale enlarged from that of FIGS. 1 to 4, showing one of the wheels and the adjacent end of the net-supporting frame.
Figure 6:
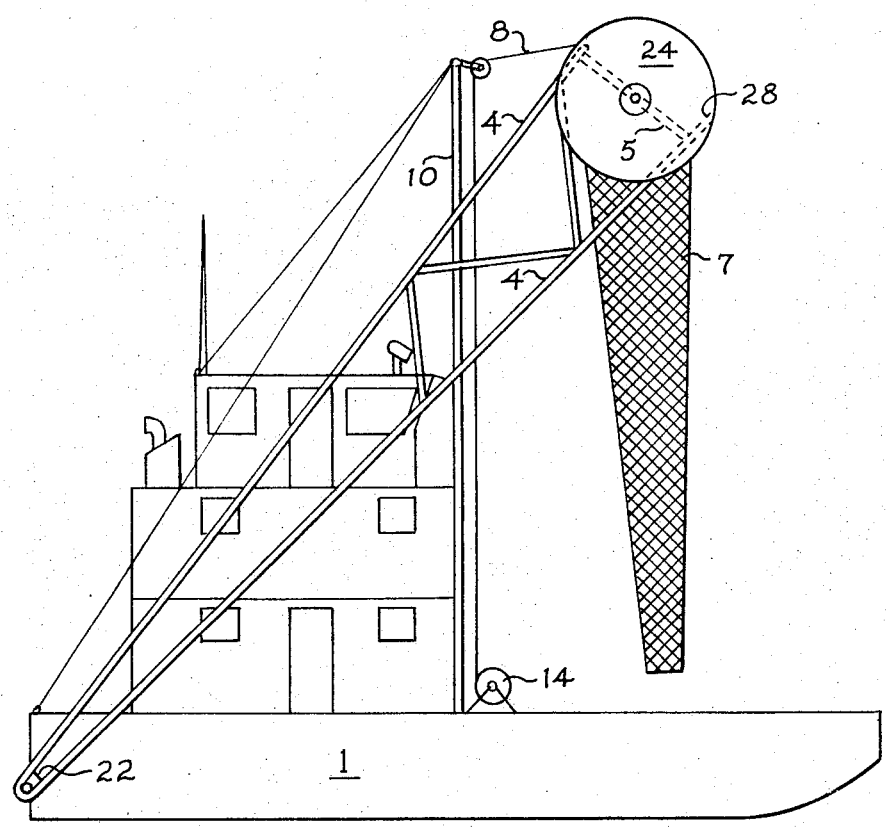
FIG. 6 is a side elevational view of the boat, with the apparatus shown as raised from its position of FIG. 1 into net-dumping location.

When used in shallow-water fishing, and especially in shell-fishing, the apparatus preferably comprises a bottom-contacting member that rakes or drags over the ground, or over the beds of oysters or the like, breaking the shells loose from their anchorage, so that they are scooped up by the forward-moving net opening. In each form of the invention thus used (shown in FIGS. 1 to 6 and in FIG. 7) the preferable fish-moving member, extending between and fastened to the lower arms 4, optionally may be a chain, as illustrated in FIG. 2 at 30, or a set of teeth or fingers 32, fixed to the lower cross piece 6, as shown in FIG. 3.

The net 7 may be any known type of fish-netting means. It is supported by the forward end of the frame, its top and bottom edges at its forward end being firmly fastened, for example by hoops, to the upright elements 5 and cross pieces 6. The type of net illustrated, approximately triangular in longitudinal cross sections, is easily tied and untied at the knot 34. Optionally, a bag-like, rectangular-in-cross-section net, closable by a zipper at its after end, may be substituted for this type of net. Also optionally, the net may have a much wider mouth; and in this event the frame arms 4 are not parallel, but instead fan outward from each other from the pivot bearing adjacent to the vessel's side to widely spaced points forward of and laterally spaced from the bow.

In FIG. 7, the barge 2 is shown as supporting a grooved pulley or elongated roller 36, over which the line 8 runs in lowering and raising the net frame and net. The pulley or roller has a forked support 38, fixed by bolting, welding or the like to the bow of the barge. Instead of a single roller or pulley the element 36 may be a line-guiding, centrally-located pulley and may be flanked by one or a pair of cylindrical rollers. This pulley-and-roller combination (or alternatively the single elongated roller), reducing net friction at the bow, is of considerable aid in lifting a net that is large and loaded with fish, especially when fishing for oysters or the like. Obviously such an elongated roller or pulley also may be fixed to the bow of the powered boat in FIGS. 1 to 6. This rotary means is optionally as wide or nearly as wide as the net.

FISHING METHOD

The method of fishing is facilitated by the invented apparatus. This method comprises the following steps: (1) inserting a fish net over the bow of a vessel to a location in the water below the bow and allowing it to move sternward below the vessel; (2) holding the mouth of the net open; (3) moving the craft forward until the net contains a desired load of fish; (4) lifting the net by the edge of its mouth into an upright position above the craft; and (5) emptying the fish on board the vessel. The above steps (1) and (4) comprise supporting the net on a frame straddling a substantial portion of the vessel and pivoting a forward portion of the frame over the bow with the aid of a winch and a line.

Within principles of the invention and the scope of the following claims, various changes in the specific disclosed structure may be made. For example, for use on a catamaran the width of the frame may be greater than that of the bow but its supported net may be narrower than the distance between the two connected hulls or floats, so that in fishing position it lies between the floats.

I claim:

1. Fishing apparatus, including:
   a net-supporting frame, adapted to be pivotally mounted on a boat means, comprising: structure for holding a net open, including separated cross pieces having a length greater than the maximum width of the bow of the boat means to be utilized; and a pair of horizontally spaced net-frame beams, separated by a distance greater than the maximum width of the bow of said boat means, having a length equal to over three-fourths of the length of said boat means, connected to said cross pieces, adapted to extend alongside and outside lateral walls of said boat means;
   pivot-bearing means, adapted to pivotally connect after portions of said net-frame beams to a stern portion of said boat means;
   a fish net, including: a forward mouth for entrance of fish; means for connecting edges of the net at said mouth to said separated cross pieces, these cross pieces aiding in holding said mouth open; and a closable after portion of the net, in use adapted to trail in the water behind said mouth and under a major portion of said boat means; and means, comprising a line fastened to said cross pieces, for inserting said frame and net over and in front of a bow and into fishing position in the water, with said mouth of the net well forward of the after end of said boat means.

2. Fishing apparatus as set forth in claim 1, including powered fishing-vessel means that comprises: a deck; a mast having an upper end which is above the deck by a distance that is at least as long as the length of said net between said mouth and after portion; a pulley, supported by an upper-end portion of said mast; and a winch, below said pulley, connected to said line.

3. Apparatus as set forth in claim 1, comprising a fish-moving member, fastened to said frame, in fishing position located forward of said mouth.

4. Apparatus as set forth in claim 3, in which said fish-moving member comprises a chain.

5. Apparatus as set forth in claim 3, in which said fish-moving member comprises a set of teeth, adapted to break shells from a bed of shellfish.

6. Apparatus as set forth in claim 2, comprising a fish-moving member, fastened to said frame, in fishing position located forward of said mouth of the net.

7. Apparatus as set forth in claim 2, in which: said net-frame beams comprise a pair of vertically and triangularly arranged tubes on each side of said vessel means; the said cross pieces comprise vertically separated upper and lower tubular members, fixed to and between end portions of said tubes; the said line is fixed to the upper one of said tubular members; and the said frame comprises a pair of upright, horizontally-spaced tubular elements, each of which is fixed to and between end portions of said cross pieces; the said net being also attached to said upright elements and held with its mouth open by said upright elements and cross pieces.

8. Apparatus as set forth in claim 1, in which: said net frame beams have a length at least equal to the length of said boat means; and said pivot-bearing means is located at and connected to an aftermost portion of said boat means.

9. Apparatus as set forth in claim 8, in which: said boat means comprises a powered vessel and a barge connected to the bow of said vessel and adapted to be pushed by it; the said net-frame beams have a length equal to over three-fourths of the combined lengths of said vessel and barge; and in use a substantial portion of the said net is located below said barge.

10. Apparatus as set forth in claim 9, including a rotary element, rotatably connected to the bow of said barge, over which the line runs in raising and lowering said net.

11. Fishing apparatus, adapted for fishing in water adjacent to the ground that is well beneath a boat means, including:
    a net-supporting frame, adapted to be pivotally mounted on a fishing vessel comprising: forward structure for supporting and holding the forward portion of a net with it mouth forwardly open; and
a pair of horizontally spaced net-frame beams, separated by a distance greater than the maximum width of said boat means, having sufficient length to extend from said boat means to a point adjacent to the ground in said fishing, connected to the said structure, adapted to extend alongside and outside lateral walls of said boat means;

a fish net, including: a forward mouth for entrance of fish; means for connecting said net to said structure; and a closable after portion of the net, in use adapted to trail in the water behind said mouth;

pivot-bearing means adapted to pivotally connect after portions of said net-frame beams to a stern portion of said boat means;

ground-engaging, rotatable-wheel means connected to forward portions of said beams, for engaging the ground, providing a clearance between the said mouth of the net and the ground; and means, comprising a line connected to said structure, for inserting said frame and net over and in front of a bow and into fishing position below the level of the bottom of said boat means.

12. Apparatus as set forth in claim 11, in which: said forward structure includes upright elements; said apparatus comprises wheel bearings connected to said upright elements; and said ground-engaging means comprises wheels rotatably mounted on said wheel bearings.

* * * * *